US012766557B2

(12) United States Patent
Fortier et al.

(10) Patent No.: US 12,766,557 B2
(45) Date of Patent: Oct. 20, 2026

(54) SCREW SYSTEM FOR MECHANICAL SEPARATION OF MATTER

(71) Applicant: INDUSTRIES MACHINEX INC., Plessisville (CA)

(72) Inventors: Paul Fortier, Plessisville (CA); Alexandre Lambert, Plessisville (CA); Frédéric Bolduc, Plessisville (CA); Alex Gobeil, Plessisville (CA); Jeremy Marcoux, Plessisville (CA)

(73) Assignee: INDUSTRIES MACHINEX INC., Plessiville (CA)

( * ) Notice: Subject to any disclaimer, the term of this patent is extended or adjusted under 35 U.S.C. 154(b) by 0 days.

(21) Appl. No.: 19/186,864

(22) Filed: Apr. 23, 2025

(65) Prior Publication Data

US 2025/0326004 A1 Oct. 23, 2025

Related U.S. Application Data

(60) Provisional application No. 63/637,544, filed on Apr. 23, 2024.

(51) Int. Cl.
*B07B 1/04* (2006.01)

(52) U.S. Cl.
CPC ............ *B07B 1/04* (2013.01); *B07B 2201/00* (2013.01)

(58) Field of Classification Search
CPC .................................... B07B 1/14; B07B 1/15
USPC .................................................. 209/362, 669
See application file for complete search history.

(56) References Cited

U.S. PATENT DOCUMENTS 4,430,210 A * 2/1984 Tuuha ........................ B07B 1/42 209/672
6,149,018 A * 11/2000 Austin .................. B07B 1/4636 209/672
2015/0290681 A1* 10/2015 Guenther ................ B07B 1/145 37/444
2021/0401025 A1 12/2021 Li et al.

FOREIGN PATENT DOCUMENTS

CN 2520952 Y * 11/2002

OTHER PUBLICATIONS

Yang; Guozhong, "Screening Machine" (English Translation), Nov. 20, 2002, worldwide.espacenet.com (Year: 2002).*

* cited by examiner

*Primary Examiner* — Molly K Devine
(74) *Attorney, Agent, or Firm* — Decode Legal Inc.; Charles-Andre Caron

(57) ABSTRACT

A system for mechanical separation of materials comprising at least two platforms, each comprising screws undergoing a rotational movement, wherein the screws have a proximal end and a distal end, the distal end being free, wherein the screws of a first one of the at least two platforms all have a first inclination from the proximal end thereof to the distal end thereof; wherein the screws of a second one of the at least two platforms all have a second inclination from the proximal end thereof to the distal end thereof; the first inclination being different from the second inclination. The at least two platforms form a drop in-between along the main direction of travel. There is a double-start thread screw by the drop on the downstream platform that prevents long objects to pass through the screws and optionally a curtain of elongated members by the drop.

13 Claims, 6 Drawing Sheets

FIGURE 2
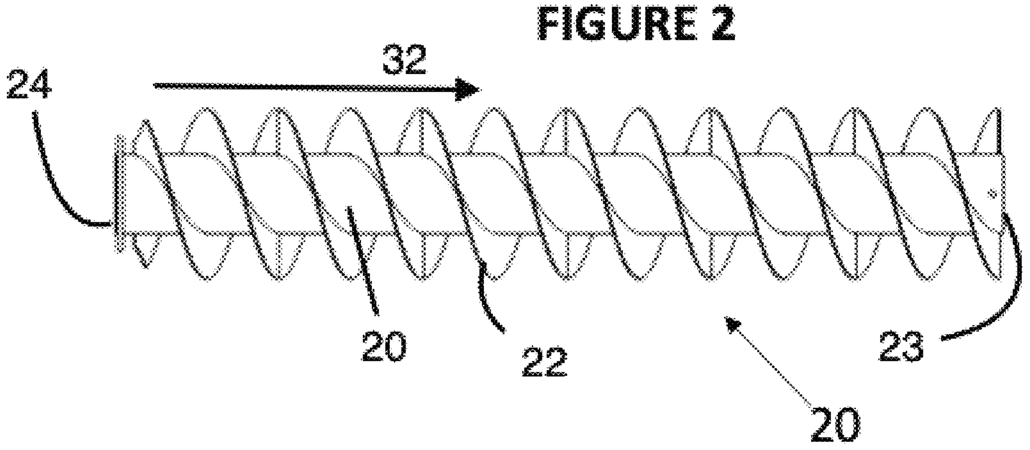
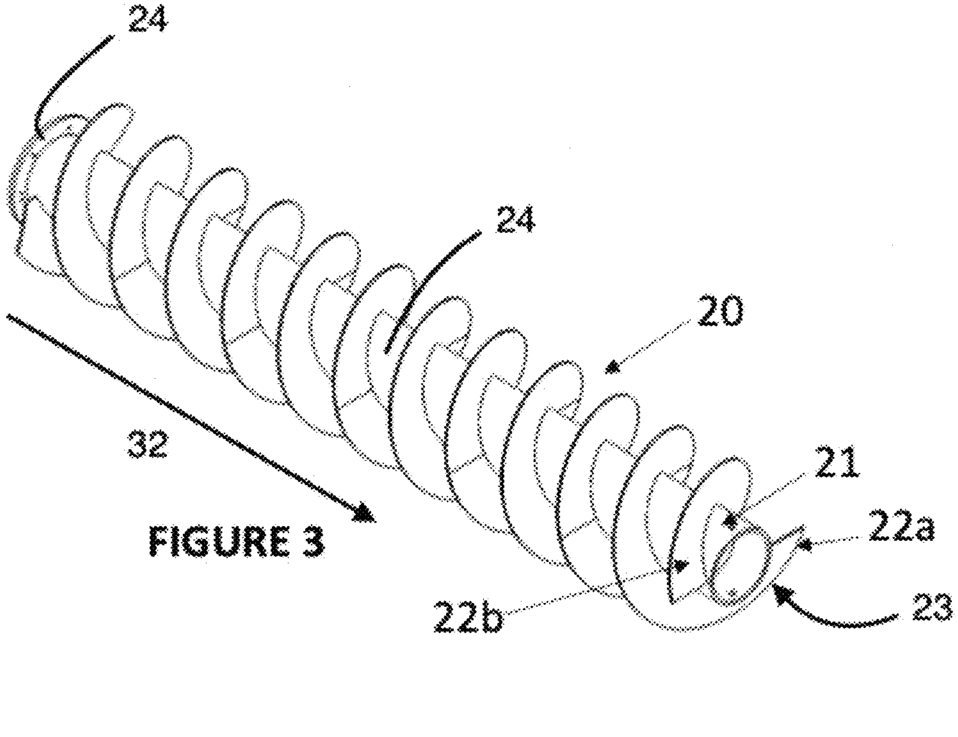
FIGURE 3

SCREW SYSTEM FOR MECHANICAL SEPARATION OF MATTER

CROSS-REFERENCE TO RELATED APPLICATION

This application claims benefit of, or priority to, U.S. provisional application 63/637,544, filed Apr. 23, 2024, the specification of which is hereby incorporated herein by reference in its entirety.

TECHNICAL FIELD

The present disclosure relates to a sorting system and methods for sorting materials, such as recyclable materials or construction materials. More specifically, it relates to a screen using auger screws.

BACKGROUND

Various systems exist for sorting materials. Sorting systems may be important in various industries, including, but not limited to, the recycling industry. Sorting out a variety of materials can involve various issues.

Notably, the passage from a conveyor to a disc screen using shafts can involve a few issues such as long parts passing through the gap between the shafts, especially when dropping from a higher level to a lower level.

SUMMARY

According to a first aspect of the disclosure, there is provided a system for mechanical separation of materials, the system comprising: a platform comprising screws providing a sieving surface for the materials to be sieved as the materials travel thereon, the screws each comprising a screw axis, the axes of the screws being parallel and neighbor to one another, the screws adapted to undergo a rotational movement, wherein at least one of the screws is a double-start thread screw and at least one of the screws is a single-start thread screw.

According to an embodiment, the platform has an upstream end according to a travel axis, with the at least one double-start thread screw being closest to the upstream end of the platform.

According to an embodiment, the platform comprises a screw base adapted to exert the rotational movement to the screws synchronously.

According to an embodiment, the screws comprises a plurality of double-start thread screws neighboring one another at the upstream end.

According to an embodiment, the platform comprises a screw base with the screws comprising a supported proximal end mounted to the screw base, and a free end distal to the screw base.

According to an embodiment, the screws have a screw inclination along the screw axis resulting in a free end of the screws being higher than a supported end of the screws.

According to an embodiment, the screws comprise a helicoidal blade mounted to a shaft, with the helicoidal blade having a pitch that is common to all the screws of the platform.

According to an embodiment, there is further provided a curtain of suspended elongated members to slow down the materials travelling on the sieving surface, wherein the curtain is suspended over a location between the 50% and 75% of a length of the platform.

According to an embodiment, the platform has an upstream end and a downstream end along a travel axis, and wherein the screws have a travel inclination along the travel axis, thereby generating a denivelation of the sieving surface between the upstream end and the downstream end.

According to an embodiment, there is further provided an upper platform sequentially upstream of said platform, providing a drop therebetween, further comprising a curtain of suspended elongated members to slow down the materials travelling on the sieving surface, wherein the curtain is suspended over the downstream platform immediately downstream of the drop.

According to a second aspect of the disclosure, there is provided a system for mechanical separation of materials, the system comprising: a platform comprising screws providing a sieving surface for the materials to be sieved as the materials travel thereon, the screws being adapted to undergo a rotational movement, the screws having a proximal end and a distal end, wherein the screws of the platform have a screw inclination from the proximal end thereof to the distal end thereof, the distal end thereof being higher than the proximal end thereof, thereby providing an inclination to the sieving surface.

According to an embodiment, each one of the screws comprises a number of helicoidal blades mounted to a shaft, wherein the helicoidal blades have a identical pitch and at least two of the screws comprise a different number of blades.

According to an embodiment, at least one of the screws is a double-start thread screw and at least one of the screws is a single-start thread screw According to an embodiment, there is further provided a curtain of suspended elongated members to slow down the materials travelling on the sieving surface, wherein the curtain is suspended over a location between the 50% and 75% of a length of the platform.

According to a third aspect of the disclosure, there is provided a system for mechanical separation of materials, the system comprising: at least two platforms, each of the platforms comprising screws providing a sieving surface for the materials to be sieved as the materials travel thereon, the screws adapted to undergo a rotational movement to exert the materials to travel thereon, wherein the screws of a first one of the at least two platforms have a first inclination relative to the horizontal, wherein the screws of a second one of the at least two platforms have a screw inclination relative to the horizontal, the first screw inclination being different from the second screw inclination.

According to an embodiment, the screws have a proximal end and a distal end, and wherein at least one of the first inclination and the second inclination results in the distal end of the screws being higher than the proximal end of the screws.

According to an embodiment, the rotation of the screws exerts a movement of the materials towards the distal end of the screws.

According to an embodiment, the screws have a screw axis, at least one of the first inclination and the second inclination comprises an angle of the sieving surface of over 0 degrees along a travel axis perpendicular to screw axis, wherein the first inclination and the second inclination have different angles of the sieving surface of the platforms along the travel axis.

According to an embodiment, the at least two platforms comprise an upstream platform and a downstream platform that are neighboring one another along a travel axis, wherein the upstream platform is higher than the downstream platform where their sieve surfaces neighbor one another, providing a drop therebetween, wherein the downstream platform comprises a double-start thread screw by the drop and a single-start thread screw more downstream to the drop.

According to an embodiment, the at least two platforms comprise an upstream platform and a downstream platform, providing a drop therebetween, that are neighboring one another along a travel axis, and further comprising a curtain of suspended elongated members to slow down the materials travelling on the sieving surface, wherein the curtain is suspended over the downstream platform immediately downstream of the drop.

According to a fourth aspect of the disclosure, there is provided a system for mechanical separation of materials, the system comprising: at least two platforms, each of the platforms comprising screws providing a sieving surface for the materials to be sieved as the materials travel thereon, the screws adapted to undergo a rotational movement to exert the materials to travel thereon, wherein the at least two platforms comprise an upstream platform and a downstream platform, providing a drop therebetween, that are neighboring one another along a travel axis, and further comprising a curtain of suspended elongated members to slow down the materials travelling on the sieving surface, wherein the curtain is suspended over the downstream platform immediately downstream of the drop.

According to an embodiment, the downstream platform comprises a double-start thread screw by the drop and a single-start thread screw more downstream to the drop.

According to an embodiment, the screws of a first one of the at least two platforms have a first inclination relative to the horizontal, wherein the screws of a second one of the at least two platforms have a screw inclination relative to the horizontal, the first screw inclination being different from the second screw inclination.

According to a fifth aspect of the disclosure, there is provided a system for mechanical separation of materials, the system comprising: a platform comprising screws providing a sieving surface for the materials to be sieved as the materials travel thereon, the screws each comprising a screw axis, the axes of the screws being parallel and neighbor to one another, the screws adapted to undergo a rotational movement, further comprising a curtain of suspended elongated members to slow down the materials travelling on the sieving surface, wherein the curtain is suspended over a location between the 50% and 75% of a length of the platform.

BRIEF DESCRIPTION OF THE DRAWINGS

Further features and advantages of the present disclosure will become apparent from the following detailed description, taken in combination with the appended drawings, in which:

FIGS. 2 and 3 are a side view and a perspective view illustrating a double-start thread screw, in accordance with an embodiment of the present disclosure;

It will be noted that throughout the appended drawings, like features are identified by like reference numerals.

DETAILED DESCRIPTION

Various aspects of the present disclosure generally address one or more of the problems of sorting recycling materials. The present description provides a system and a method for reducing issues with the current separation systems.

Figure 1:
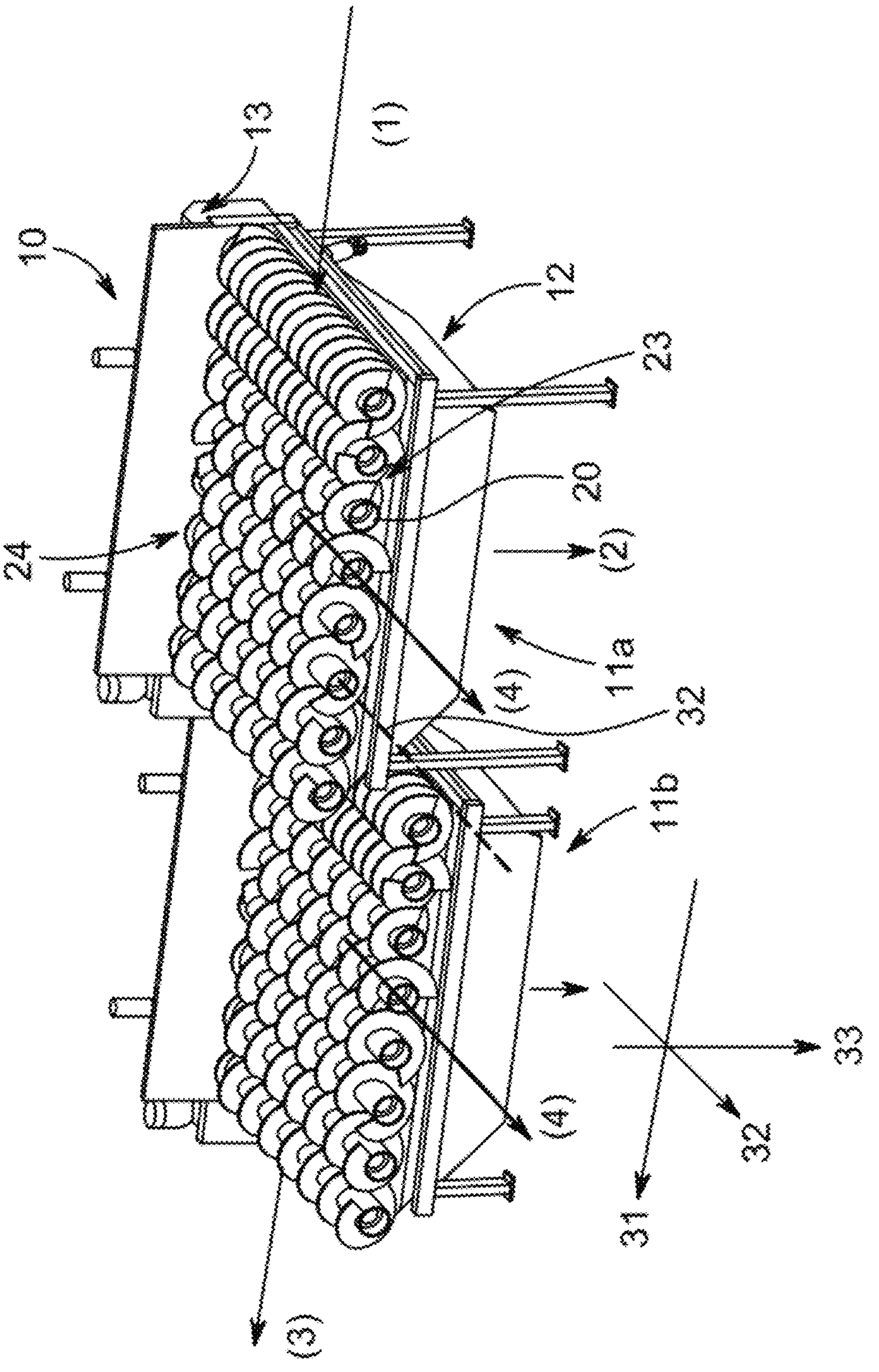
FIG. 1 is a perspective view illustrating a system for sorting comprising two platforms each operating according to its own level, each having auger screws, in accordance with an embodiment of the present disclosure.

The equipment is a mechanical separator that uses an auger or endless screw, formed of a rotating screw (shaft having a helical blade therearound) to convey material in two or three different directions. Referring to FIG. 1, the material enters at the feed point (1) (the entry point for the system 10 for mechanical separation, also called upstream end) and travel on the mechanical separator at least partially along the travel axis 31 with fine particles pass through the sieve (2) generally along sieve axis 33, end their screening travel under the screws, while larger particles remain conveyed along the travel axis 31 either to the downstream end (3) of the equipment or to the side (4) depending on the particles travelling more along the travel axis 31 or the screw axis 32, thereby providing separation (sorting or filtering with respect to fine particles). Arrows (1) and (3) in FIG. 1 together show the main direction of travel of large items travelling along the travel axis 31.

In FIG. 1, two distinct platforms (11*a*, 11*b*) are shown, for example and without limitation. Each platform (11*a*, 11*b*) is operated independently. Each platform (11*a*, 11*b*) comprises a frame 12 to provide support, notably to the screw base 13 which is the mechanical support of all the screws 20 on the platform. The screws 20 are supported at their proximal end 24 from the screw base 13, where they are also motorized together to provide rotation of the screws 20 in a synchronous manner, therethrough a helicoidal movement. The distal end 23 of the screws 20 in the platform (11*a*, 11*b*) may be unsupported (free end). The free end configuration allows for a lateral expulsion to the side (4) of midsized items caught up by the auger screws 20 driving the items outwardly to the side (4). Otherwise, items "floating" or "surfing" on the platform (11*a*, 11*b*) follow the travel axis 31 from (1) to (3) thanks to the rotational movement of the screws 20, with fine particulate matter falling (along sieve axis 33) between the screws 20 acting together as a sieve (2). Containers (not depicted) and conveyors (not depicted) may be placed below the platforms (11*a*, 11*b*) or on the side thereof to collect such particulate or midsize materials, respectively.

The advantage of this type of equipment is that the material does not get stuck being wrapped around the shafts, unlike standard disc separators. Indeed, the use of screws 20 allows the material to be ejected with the help of the screw pitch of the helicoidal blade 22 (see, e.g., FIG. 3) making up the thread of the screw 20. The shaft 24 (see e.g., FIG. 3), part of a screw instead of merely being surrounded by discs, comprises a free end 23, as the screw 20 is an endless screw with the helicoidal blade 22 forming the screw 20. The free end 23 is unsupported, which means that the screws 20 are rather supported by the proximate end 24, and provided in a cantilever arrangement.

The challenge that comes with avoiding sticking (wrapping) of the materials to the screw 20 is for the screw 20 to maintain a certain level of agitation to prevent fine particles from "surfing" on larger pieces (such as cardboard).

According to an embodiment of the disclosure, the system 10 can be formed of two platforms (11*a*, 11*b*) disposed into two levels to create a drop between the levels. This drop has the advantageous purpose of flipping the larger pieces to provide some form of agitation which increases sieving efficiency. The downside of this way of doing things is that the height difference (the drop) allows long objects to get an inclination when dropping and then unfortunately to pass through the sieve between the screws 20, whereas they should have passed over the top surface of the screws 20 of the next platform (they should not pass therethrough).

In order to benefit from the advantages of the material drop (flipping larger pieces) without losing the long parts through the gap between the screws 20, the screw 20 being used according to an embodiment of the disclosure is a double-start thread screw, as illustrated in FIGS. 2 and 3. More specifically, FIGS. 2 and 3 shows that each double-thread screw 20 is formed of a central shaft 21, which is an elongated member extending along the screw axis 32, with two helical blades (22*a*, 22*b*) extending on the surface thereof. Instead of having a single-start thread screw, whereby the area opposed to the thread is void and allows materials to pass through the gap, the double-start thread screw 20 has two threads (helicoidal blades 22*a*, 22*b* over the central shaft 21 of the screw 20), such that there is always one thread azimuthally opposed to the other.

Figure 4:
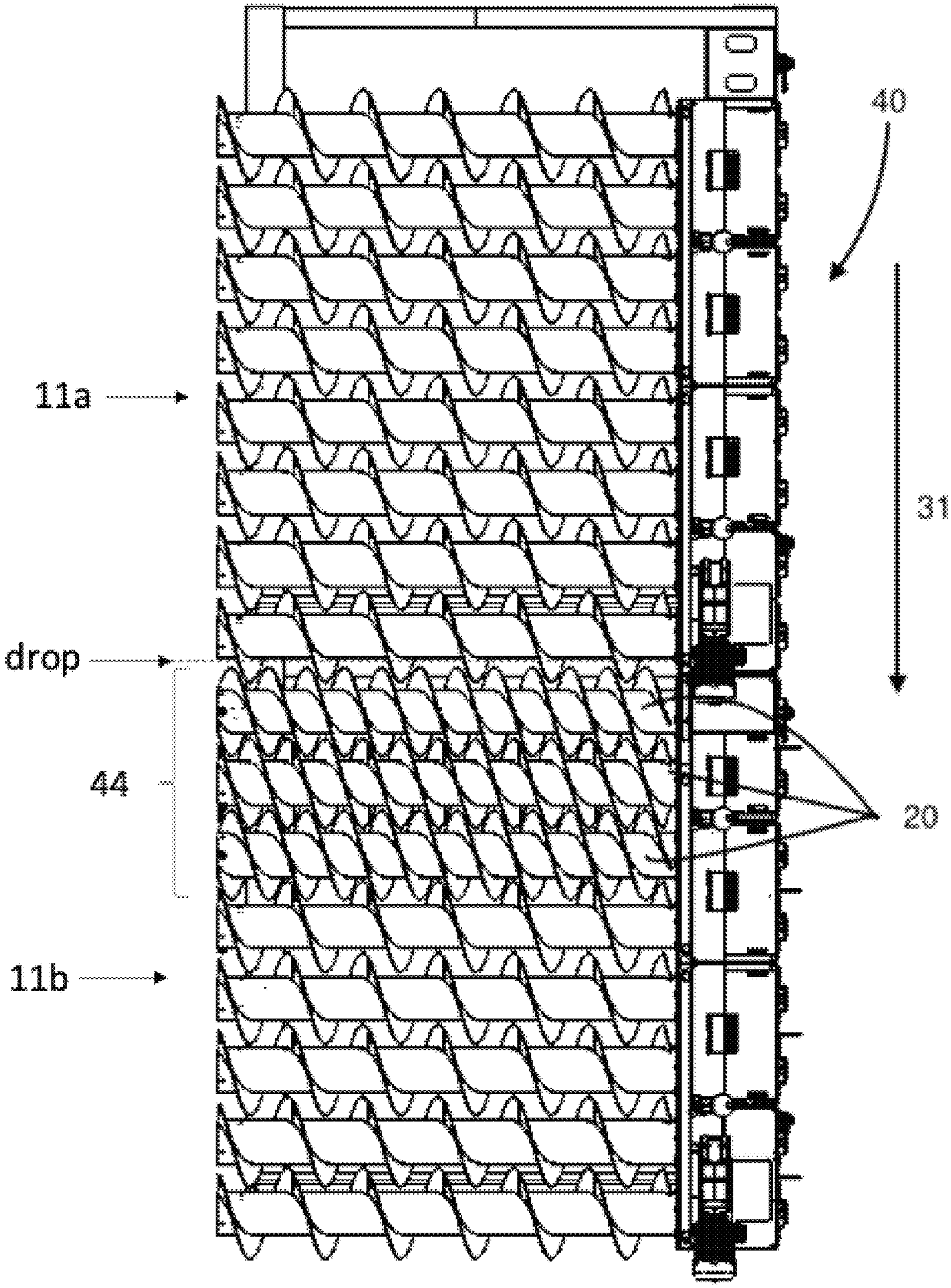
FIG. 4 is a top view illustrating a system comprising two platforms for mechanical separation having a drop between successive platforms, wherein the first(s) screw(s) in the second platform (i.e., after the drop) are double-start thread screws and a remainder of the screws on this platform are single-start thread screws, in accordance with an embodiment of the present disclosure.

More specifically, and referring to FIG. 4, bracket 44 indicates arrangement 40 of successive parallel screws being double-start thread screws 20 on the platform 11*b*. At least one and preferably at least two of the first screws 20 in the platform 11*b* after the entry point or drop (in platform 11*a*) are double-start thread screws 20, for example between 1 and 5 are double-start thread screws, preferably between 2 and 4 are double-start thread screws, and more preferably 3 are double-start thread screws. This reduces the presence of a gap, to locally reduce the sieve openings and considerably reducing the risk of an inclined elongated thin object being able to pass between adjacent screws 20 when dropping from an upstream platform to the next platform being at a lower level. A remainder of the screws 20 in the platform are single-start thread screws, with a more standard gap in-between for sieving to let fine particles pass therethrough.

According to an embodiment, each platform (11*a*, 11*b*) comprises a combination of double-start thread screws according to the disclosed numerical range at the upstream end or entry of the platform, and single-start thread screws for the remainder of the platform.

More specifically, with a pair of successive parallel screws, the neighboring of two (adjacent) double-start thread screws creates a minimal opening therebetween, and the neighboring of one double-thread screw and an single-thread screw contributes to creating a medium/progressive opening. Long parts cannot go through such small gaps, which makes this arrangement suitable for the entry of the platform where a first insertion of drop of material occurs. This variation in opening should help stabilize the long objects to prevent them from passing through as if they were small particles. This arrangement is illustrated in FIG. 4. This arrangement could also potentially eliminate the need for a feeding conveyor that is currently necessary to accelerate and spread the material. The equipment advantageously relates to the combination of one or more double-start thread screws and one or more single-start thread screws. However, a larger gap is required for proper sieving, and the remaining screws afterwards on the platform are single-start thread screws.

It is worth noting that according to an embodiment, all of the helicoidal blades 22 of the single-start thread screws and of the double-start thread screws of a platform have an identical pitch, preventing the particles to be locked along the screw axis 32 between two blades 22 of neighboring screws, regardless them being single-start thread screws, double-start thread screws, or a combination thereof. For this characteristic, the pitch refers to the distance along the screw axis 32 between two points of one helicoidal blade 22 distant of one revolution of the helicoidal blade 22 as is understood by a person skilled in the art.

According to an embodiment, the pitch direction of the screws of a platform is constant over at least two neighboring screws.

According to an embodiment, the distance between two neighboring screws is one time the average minor diameter of the screws minus between 0.75 and 0.9 time the height of the blade (also known as the flight, the height is measured perpendicularly to the screw axis from the exterior surface of the shaft, which is typically).

According to embodiments, the exterior surface of the blades are smooth, or features an indentations of a fraction of the height of the blades which provides the desired grip, bounce and sliding characteristic to the screws relative to the material traveling thereon.

Figure 5:
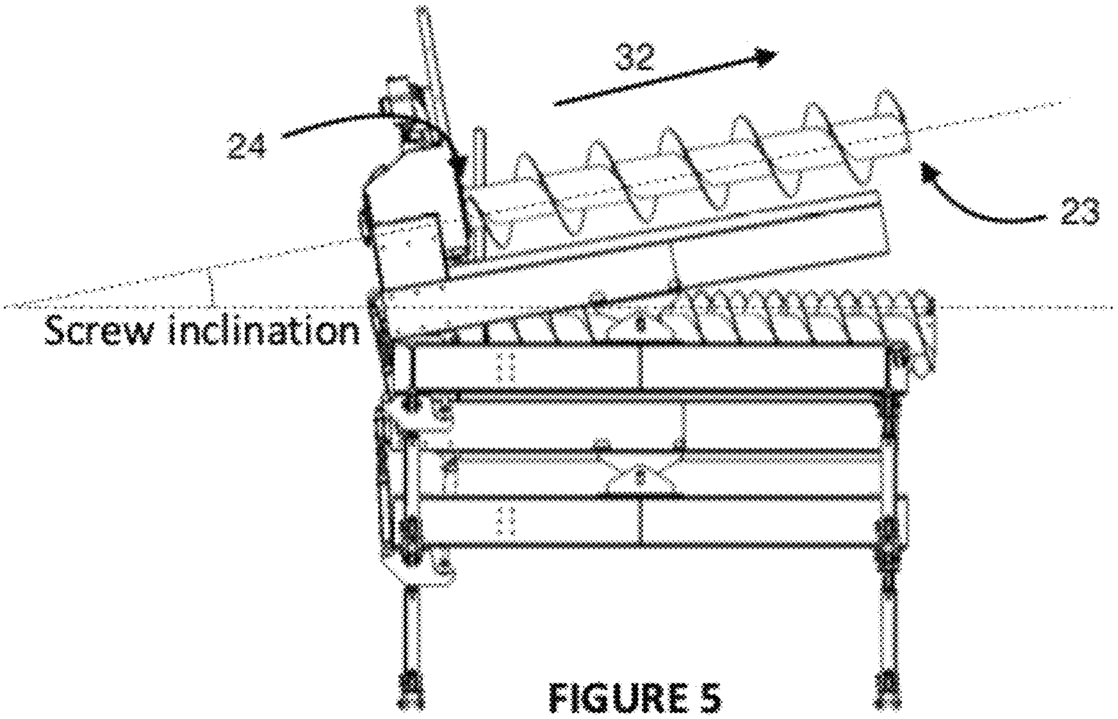
FIG. 5 is a perspective view illustrating a system wherein the screws in the platform have an inclination upwardly from their proximal end to the unsupported distal end, in accordance with an embodiment of the present disclosure.
Figure 6:
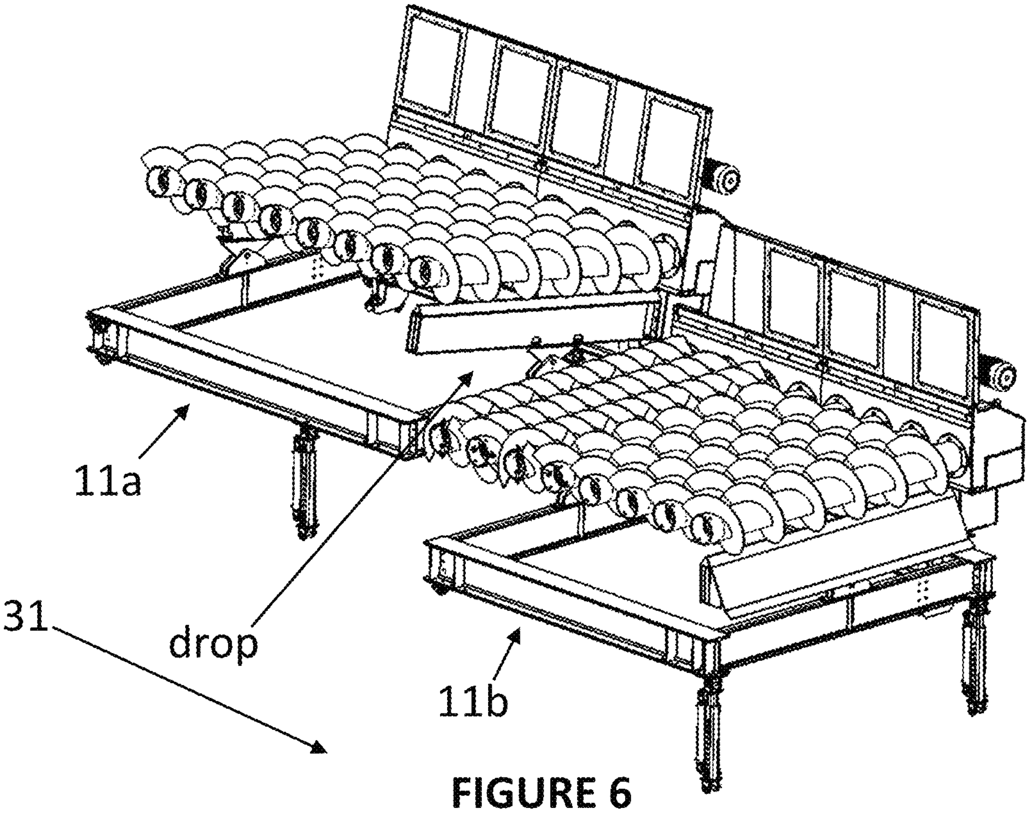
FIG. 6 is a perspective view illustrating a system comprising two platforms for mechanical separation, each having independently adjustable inclination of their respective set of screws, in accordance with an embodiment of the present disclosure.
Figure 7:
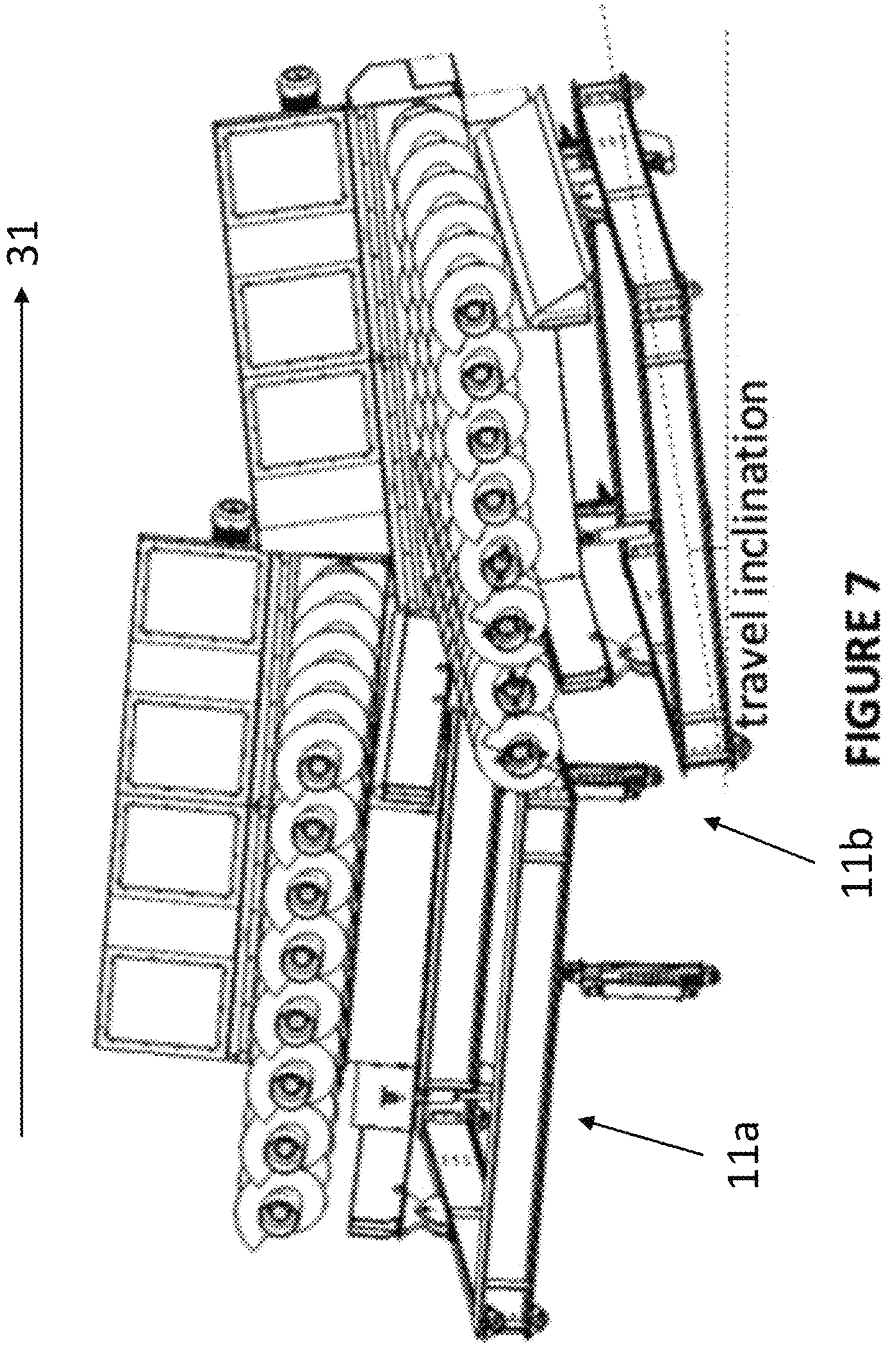
FIG. 7 is a perspective view illustrating a system comprising two platforms for mechanical separation, each having independently adjustable inclination preferably along two axes (i.e., screw inclination along the screw axis, and travel inclination along the travel axis), in accordance with an embodiment of the present disclosure.

One of the elements disclosed is the use of an auger separator with a positive inclination along the screw axis 32 relative to the horizontal, as illustrated in FIG. 5 (and also illustrated in FIGS. 6-7). The screw 20 is inclined upwardly from the supported proximal end 24 to the unsupported distal end, that is the free end 23. As a reminder, the main direction of travel called travel axis 31 for the materials to be separated (see e.g., FIG. 1) is perpendicular to the screw axis 32. Material traveling on the platform is being moved frontwardly along the travel axis 31 of each platform (see, e.g., in FIG. 1), and also drifting toward the side thereof along the screw axis 32 under the action of the auger screws (see e.g., in FIG. 1). The screws being inclined exerts the material to travel back to the proximal end 24, counterbalancing the action of the rotating auger screws that push material toward the free end 23 on the side 4. This configuration results in the material remaining on the sieving area longer, thus increasing the quality of separation. Therefore, the present disclosure relates, among others, to a mechanical separator having at least one platform having an inclination of the screws greater than 0° upwardly from the supported proximal end 24 to the unsupported distal end, e.g., free end 23.

In relation with FIG. 6, there is illustrated an arrangement in which there are two auger separators platforms arranged in series.

More specifically in relation with FIG. 7, there is illustrated an arrangement in which there are two auger separators platforms arranged in series with independent angular adjustment along two (2) independent axes for each on of them to optimize configurations. In other words, the platforms together configured in series, form a system for mechanical separation that can be inclined upwardly or downwardly both along the travel axis 31 (hereinafter the travel inclination, which is perpendicular to the screw axis 32) and along the screw axis 32 perpendicular to the travel axis 31 (hereinafter the "screw inclination"). A typical case would be to have the first separator platform 11*a* flat relative to the travel inclination, which avoids slowing down objects heading towards the drop point, and the screw inclination being a positive angle from their supported end, which ensures optimum material retention on the platform despite the screw helicoidal rotation; with the second separator having a positive travel inclination, thus inclined upwardly along the travel axis to provide a denivelation that lifts the material to ensure a longer optimal sieving period. Independent adjustment of the travel inclination and screw inclination for the two platforms allows to get to adjust the platform with the objective to increase the quality of separation.

According to an exemplary embodiment of the disclosure, the screws with the enclosure or screw base 13 holding the screws are inclined with respect to the frame 12 of the platforms; and the frame 12 is inclined along the travel axis 31 with respect to the floor. Travel inclination and/or screw inclination can be performed for example by actuators such as hydraulic cylinders, or a motor with gears. Adjustment of inclinations can be provided over both axes of a single platform, and independently for all platforms in the series of platforms.

Figure 8:
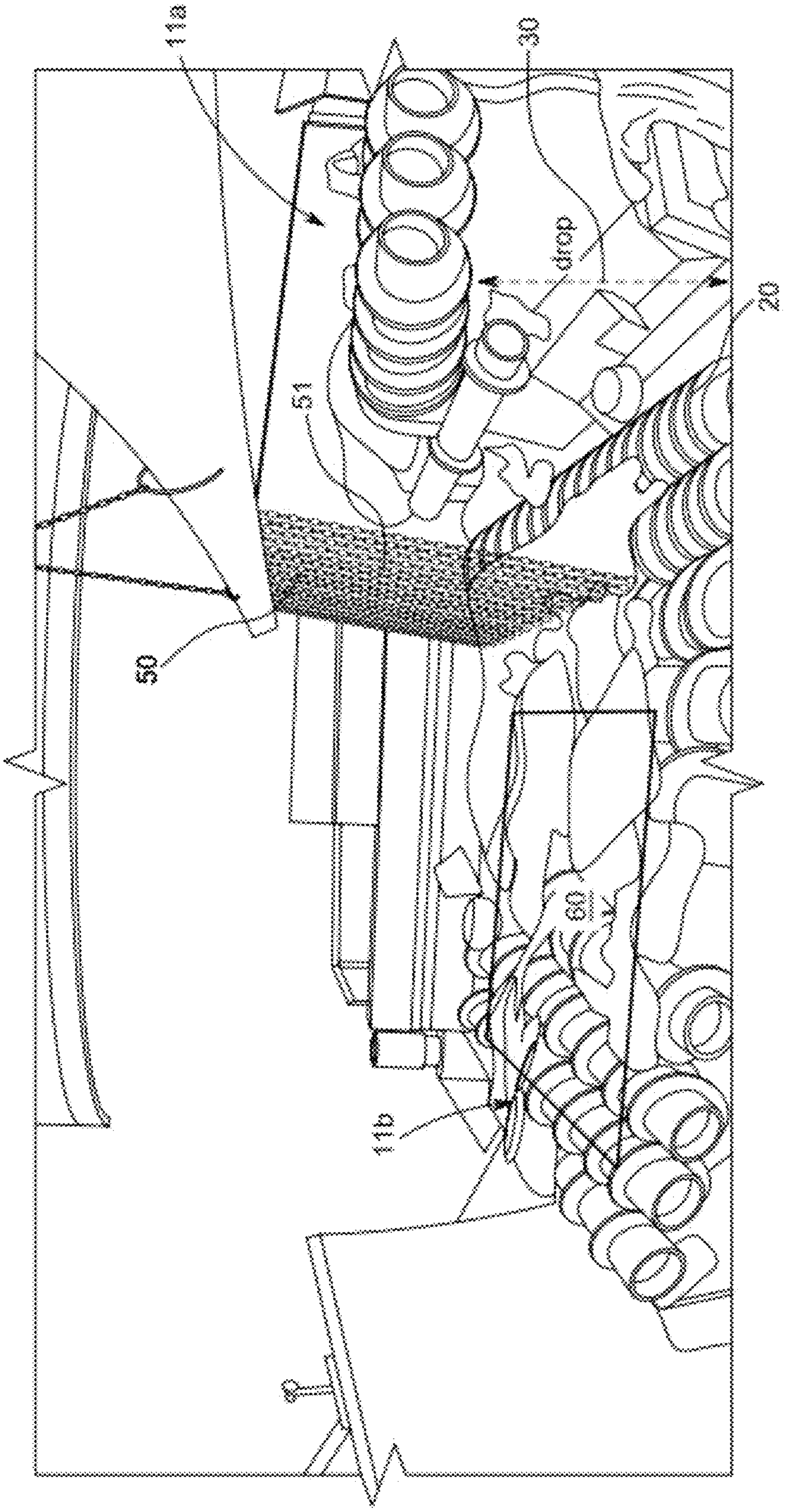
FIG. 8 is a perspective view illustrating a system comprising two platforms for mechanical separation and a chain curtain suspended from above with the bottom of the chains while in use in accordance with an embodiment of the present disclosure.

Referring to FIG. 8, a system in accordance with an embodiment comprises a curtain of suspended elongated members, such as a chain curtain 50 suspended above a platform. The chains 51 of the chain curtain 50 are suspended above the screws 50 of the sieving surface 60 of the platform. The bottom of the chains 51 may touch the screws, or the lower end may lie slightly above the screws 20, creating an obstacle that slows down the travel of the materials over the sieving surface 60. The curtain of suspended elongated members can be provided above the platform (whether on a single platform, or above one or many platforms among a plurality of platforms), at a location which lies above a line located between 50% and 75% of the length of the platform in the downstream direction. In this case, the purpose of the curtain of suspended elongated members or chain curtain 50 would be to sweep the items being transported on the screws of that platform, where larger items would not be significantly slowed down, but this curtain would act to retain smaller debris lying on said items, so that they do not move forward as for the larger items which carry them, making them eventually fall from said items and down through the interstice between the screws of that platform. This is used therefore to remove smaller free-riding debris lying on larger items, contributing to a more efficient separation of materials, whether in a single-platform system or multi-platform system (on any number of platforms of the system).

Alternatively or additionally, and only in a multi-platform system (at least two platforms, that is, two or more), a curtain of suspended elongated members can be located above the downstream platform 11*b* of the system in the case of a drop between a selected pair of two successive platforms (one being higher/upstream and the other being lower/downstream among that pair). The chains 51 of the chain curtain 50 are suspended above the screws 50 immediately downstream to the drop 30 and, in this case, participate in the flip over of long items dropping from the upstream platform 11*a* to the downstream platform 11*b*, for a "flip over" to take place at the drop 30. Adding the chain curtain 50 (generally a curtain of suspended elongated members), or other means such as obstacles slowing down the travel of the material over the sieving surface and influencing the falling path of the materials at the drop 30, improves the separation process by slowing down the travel of the materials, by helping the materials (such as long items) flipping over at the drop 30, and exerting more contact between the material and the screws 20 at the location of the chain curtain 50. This flip over also contributes to ejection of smaller debris from long items having flipped while dropping, contributing to a more efficient separation of materials.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A system for mechanical separation of materials, the system comprising:

at least two platforms, each of the at least two platforms comprising screws providing a sieving surface for the materials to be sieved as the materials travel thereon, the screws each comprising a screw axis, the screw axes being parallel and neighboring one another, the screws adapted to undergo a rotational movement, wherein the at least two platforms comprise an upstream platform and a downstream platform with the upstream platform being higher than the downstream platform where their sieve surfaces neighbor one another providing a drop therebetween, the at least two platforms neighboring one another along a travel axis, and wherein at least one of the screws of a first one of the at least two platforms is a double-start thread screw and at least one of the screws of the first one of the at least two platforms is a single-start thread screw.

2. The system of claim 1, wherein at least one of the at least two platforms has an upstream end according to the travel axis, with the at least one double-start thread screw being closest to the upstream end of the first one of the at least two platforms.

3. The system of claim 2, wherein the screws comprise a plurality of double-start thread screws neighboring one another at the upstream end.

4. The system of claim 1, wherein at least one of the at least two platforms comprises a screw base with the screws comprising a supported proximal end mounted to the screw base, and a free end distal to the screw base.

5. The system of claim 4, wherein the screws have a screw inclination along the screw axis resulting in the free end of the screws being higher than a supported end of the screws.

6. The system of claim 4, wherein each one of the screws comprises a number of helicoidal blades mounted to a shaft, wherein the helicoidal blades have an identical pitch.

7. The system of claim 1, wherein at least one of the two platforms has an upstream end and a downstream end along a travel axis, and wherein the screws have a travel inclination along the travel axis, thereby generating a denivelation of the sieving surface between the upstream end and the downstream end.

8. The system of claim 1 comprising:
- wherein the screws of the first one of the at least two platforms have a first screw inclination relative to the horizontal,
- wherein the screws of a second one of the at least two platforms have a second screw inclination relative to the horizontal, the first screw inclination being different from the second screw inclination.

9. The system of claim 8, wherein the screws have a proximal end and a distal end, and wherein at least one of the first screw inclination and the second screw inclination results in the distal end of the screws being higher than the proximal end of the screws, wherein rotation of the screws exerts a movement of the materials towards the distal end of the screws.

10. The system of claim 8, wherein at least one of the first inclination and the second inclination comprises an angle of the sieving surface of over 0 degrees along a travel axis perpendicular to the screw axis,
- wherein the first inclination and the second inclination have different angles of the sieving surface of the platforms along the travel axis.

11. The system of claim 1, wherein one of the at least one double-start thread screw of the first one of the at least two platforms is located by the drop and at least one of the at least one single-start thread screw is located more downstream of the drop.

12. The system of claim 1, wherein the screws of one of the at least two platforms rotate in a first direction, causing material thereon to travel at least partially along the travel axis.

13. The system of claim 1, wherein the single-start thread screw and the double-start thread screw are neighboring screws extending parallel to one another, wherein the threads of each of the neighboring screws extend towards the other neighboring screw into a common sieving area in-between the neighboring screws.

* * * * *